(12) United States Patent
Yoo et al.

(10) Patent No.: US 11,367,928 B2
(45) Date of Patent: Jun. 21, 2022

(54) ELECTRODE ASSEMBLY AND METHOD FOR MANUFACTURING THE SAME

(71) Applicant: LG CHEM, LTD., Seoul (KR)

(72) Inventors: Mi Jung Yoo, Daejeon (KR); Byung Heon Shin, Daejeon (KR); Woo Yong Lee, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 0 days.

(21) Appl. No.: 16/638,887

(22) PCT Filed: Jan. 24, 2019

(86) PCT No.: PCT/KR2019/001047
§ 371 (c)(1),
(2) Date: Feb. 13, 2020

(87) PCT Pub. No.: WO2019/208912
PCT Pub. Date: Oct. 31, 2019

(65) Prior Publication Data
US 2020/0194763 A1 Jun. 18, 2020

(30) Foreign Application Priority Data
Apr. 23, 2018 (KR) .................... 10-2018-0046762

(51) Int. Cl.
*H01M 50/463* (2021.01)
*H01M 10/04* (2006.01)

(52) U.S. Cl.
CPC ....... *H01M 50/463* (2021.01); *H01M 10/049* (2013.01); *H01M 10/0436* (2013.01); *H01M 10/0468* (2013.01); *H01M 2220/30* (2013.01)

(58) Field of Classification Search
CPC ....... H01M 10/02–0525; H01M 10/058–0587; H01M 50/463–469
See application file for complete search history.

(56) References Cited

U.S. PATENT DOCUMENTS 9,325,028 B2 4/2016 Kwon et al.
9,768,419 B2 9/2017 Seong
(Continued)

FOREIGN PATENT DOCUMENTS

EP 1 833 108 A1 9/2007
KR 10-2013-0103202 A 9/2013
(Continued)

OTHER PUBLICATIONS

Extended European Search Report for European Application No. 19792172.9, dated Nov. 16, 2020.
(Continued)

*Primary Examiner* — Jonathan Crepeau
*Assistant Examiner* — Jacob Buchanan
(74) *Attorney, Agent, or Firm* — Birch, Stewart, Kolasch & Birch, LLP

(57) ABSTRACT

An electrode assembly including an electrode stack including a plurality of radical units including an electrode and a separator and having a structure in which the plurality of radical units are sequentially stacked, wherein at least a portion of a circumference of the electrode stack is surrounded by the separator, a curved surface having a curvature radius is formed on a top or bottom surface of the electrode stack, and the separator surrounding at least the portion of the circumference of the electrode stack surrounds the curved surface formed on the electrode stack to maintain a relative distance between the radical units adjacent to each other is provided. A method of forming the electrode assembly is also provided.

4 Claims, 5 Drawing Sheets

(56) References Cited

U.S. PATENT DOCUMENTS

| | | |
|---|---|---|
| 9,799,926 B2 | 10/2017 | Choi et al. |
| 9,837,682 B1 | 12/2017 | Nikkhoo et al. |
| 10,297,868 B2 | 5/2019 | Choi et al. |
| 2003/0013012 A1* | 1/2003 | Ahn ................... H01M 6/46 429/152 |
| 2003/0039883 A1 | 2/2003 | Notten et al. |
| 2011/0097615 A1* | 4/2011 | Goh ................. H01M 50/116 429/94 |
| 2013/0108907 A1 | 5/2013 | Bhardwaj et al. |
| 2014/0079979 A1 | 3/2014 | Kwon et al. |
| 2014/0212729 A1 | 7/2014 | Park et al. |
| 2014/0373343 A1 | 12/2014 | Park et al. |
| 2015/0113796 A1 | 4/2015 | Han et al. |
| 2015/0140371 A1 | 5/2015 | Slocum |
| 2015/0221900 A1 | 8/2015 | Seong |
| 2016/0126583 A1* | 5/2016 | Kato ............... H01M 10/0585 429/185 |
| 2016/0268625 A1 | 9/2016 | Choi et al. |
| 2017/0263982 A1 | 9/2017 | Choi et al. |
| 2018/0076442 A1 | 3/2018 | Choi et al. |
| 2018/0254510 A1 | 9/2018 | Cho et al. |

FOREIGN PATENT DOCUMENTS

| | | |
|---|---|---|
| KR | 10-2013-0131246 A | 12/2013 |
| KR | 10-2014-0035689 A | 3/2014 |
| KR | 10-2015-0015320 A | 2/2015 |
| KR | 10-2015-0015355 A | 2/2015 |
| KR | 10-2015-0092669 A | 8/2015 |
| KR | 10-2016-0015769 A | 2/2016 |
| KR | 10-2016-0067059 A | 6/2016 |
| KR | 10-2016-0074209 A | 6/2016 |
| KR | 10-2017-0000368 A | 1/2017 |
| KR | 10-2017-0059895 A | 5/2017 |
| WO | WO 2015/057643 A1 | 4/2015 |

OTHER PUBLICATIONS

International Search Report (PCT/ISA/210) issued in PCT/KR2019/001047, dated May 9, 2019.

* cited by examiner

ELECTRODE ASSEMBLY AND METHOD FOR MANUFACTURING THE SAME

CROSS-REFERENCE TO RELATED APPLICATION

The present application claims the benefit of the priority of Korean Patent Application No. 10-2018-0046762, filed on Apr. 23, 2018, which is hereby incorporated by reference in its entirety.

TECHNICAL FIELD

The present invention relates to an electrode assembly and a method for manufacturing the same, and more particularly, to an electrode assembly having a curved surface and a method for manufacturing the same.

BACKGROUND ART

As the demands for electronic devices and the consumer's demands for electronic devices become increasingly diverse, specifications required for secondary batteries that are mounted on the electronic devices and repeatedly chargeable and dischargeable are also diversified. For example, recently, to improve the grip feeling when the user for utilizing the electronic device holds the electronic device by using his/her hand, the electronic device may be required to have a curved shape deviating from the existing angular shape. For this, the secondary battery may also be required to have a curved shape deviating the existing shape. Alternatively, to maximize the utilization of the internal space of the electronic device, it is required that the shape of the secondary battery has an irregular shape such as the curved shape or the like deviating the existing regular shape.

To manufacture the secondary battery having the curved shape, it is generally necessary to press an outer surface of an electrode assembly by using a pressing press having a curved surface. However, according to the related art, there have been various problems in the process of pressing the outer surface of the electrode assembly by using the pressing press to form the curved surface.

For example, an electrode and a separator are in a state of being bonded to each other within the electrode assembly before being pressed by the pressing press. Thus, even if the electrode assembly is pressed by the pressing press to form the curved shape, the curved surface may not be maintained due to the bonding force between the electrode and the separator before being pressed by the pressing press, and thus, the curved surface may return to the state before being pressed. This problem tends to become worse as a radius of curvature of the curved surface formed by the pressing press decreases (i.e., as the electrode assembly is more bent by the pressing press).

Also, when a curved surface is formed by pressing the stacked type electrode assembly in which the electrode and the separator are alternately stacked, since a constituent for supporting the electrode assembly to maintain the curved shape of the stacked type electrode assembly is not provided, the electrode and the separator within the electrode assembly may be delaminated. This problem also tends to become worse as the radius of curvature of the curved surface formed by the pressing press decreases.

The above problems have been obstacles to manufacture an electrode assembly, on which a curved surface having a relatively small curvature radius is formed, and a secondary battery.

DISCLOSURE OF THE INVENTION

Technical Problem

Therefore, an object to be solved by the present invention is to manufacture an electrode assembly on which a curved surface having a curvature radius that is relatively less than that of an electrode assembly according to the related art.

Technical Solution

To achieve the above object, according to an aspect of the present invention, an electrode assembly may include an electrode stack including a plurality of radical units, each radical unit including at least one electrode and at least one separator, wherein the plurality of radical units are sequentially stacked, wherein at least a portion of a circumference of the electrode stack is surrounded by a wound separator, wherein a curved surface having a curvature radius is formed on a top or bottom surface of the electrode stack, and wherein the separator surrounding at least the portion of the circumference of the electrode stack surrounds the curved surface formed on the electrode stack to maintain a relative distance between the radical units adjacent to each other.

The curvature radius may range between 70 mm to 110 mm.

The plurality of radical units may include a first bi-cell of which a positive electrode of the at least one electrode is disposed on outermost ends thereof, and a second bi-cell of which a negative electrode of the at least one electrode is disposed on opposite outermost ends thereof, wherein the electrode stack has a structure in which the first bi-cell and the second bi-cell are alternately stacked, and wherein a separate separator is disposed between the first bi-cell and the second bi-cell.

The wound separator surrounding at least the portion of the circumference of the electrode stack may be separated from the at least one separator of each radical unit and the separate separator disposed between the first bi-cell and the second bi-cell.

The wound separator surrounding at least the portion of the circumference of the electrode stack may surround the entire circumference of the electrode stack.

To achieve the above object, according to another aspect of the present invention, a method for manufacturing an electrode assembly may include a step of preparing a plurality of first bi-cells of which a positive electrode is disposed on opposite outermost ends of each first bi-cell and a plurality of second bi-cells on which a negative electrode is disposed on opposite outermost ends of each second bi-cell; a stacking step of alternately stacking each of the first bi-cells, a separate separator, and each of the second bi-cells to manufacture an electrode stack; a separator winding step of providing a wound separator to surround at least a portion of a circumference of the electrode stack; and a curved surface formation step of pressing the electrode stack by using a pressing press having a curved surface to form a curved surface on a top or bottom surface of the electrode stack, wherein, after the curved surface formation step, the wound separator surrounding at least the portion of the circumference of the electrode stack surrounds the curved surface formed on the electrode stack to maintain a relative distance between the first and second bi-cells adjacent to each other.

In the curved surface formation step, the curved surface formed on the top or bottom surface of the electrode stack may have a curvature radius of 70 mm to 110 mm.

In the stacking step, the first bi-cell may be disposed on opposite outermost ends of the electrode stack, and a single-sided positive electrode on which a positive electrode active material is applied to only one surface of a collector is provided as one of the positive electrodes disposed on one of the outermost ends of the first bi-cell, which is disposed on outermost ends of the electrode stack.

The first bi-cell may have a structure in which one of the positive electrodes, a separator, a negative electrode, a separator, and an other of the positive electrodes are disposed, and the second bi-cell may have a structure in which one of the negative electrodes, a separator, a positive electrode, a separator, and an other of the negative electrodes are disposed.

In the stacking step, eight first bi-cells and seven second bi-cells may be provided in the electrode stack.

In the separator winding step, the wound separator surrounding at least the portion of the circumference of the electrode stack may be a separator that is separated from the separators of the first and second bi-cells and the separate separator disposed between the first bi-cell and the second bi-cell.

In the separator winding step, the wound separator surrounding at least the portion of the circumference of the electrode stack may surround the entire circumference of the electrode stack.

In the curved surface formation step, the pressing press may press the electrode stack at a temperature of 60° C. to 100° C.

In the curved surface formation step, the pressing press may press the electrode stack at a pressure of 400 kgf to 800 kgf.

In the curved surface formation step, the pressing press may press the electrode stack for a time period of 40 seconds to 70 seconds.

Advantageous Effects

According to the present invention, the electrode assembly on which the curved surface having the curvature radius that is relatively less than that of the electrode assembly according to the related art, may be manufactured.

MODE FOR CARRYING OUT THE INVENTION

Hereinafter, a structure of an electrode assembly according to an embodiment of the present invention will be described with reference to the accompanying drawings.

Electrode Assembly

Figure 1:
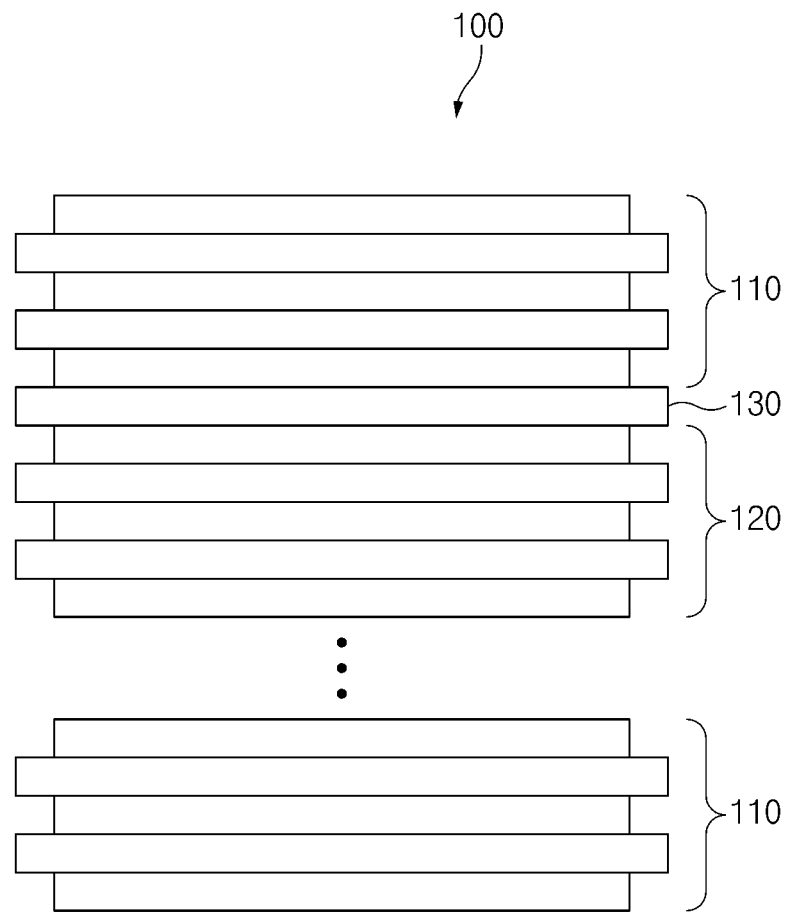
FIG. 1 is a side view of an electrode stack according to an embodiment of the present invention.
Figure 2:
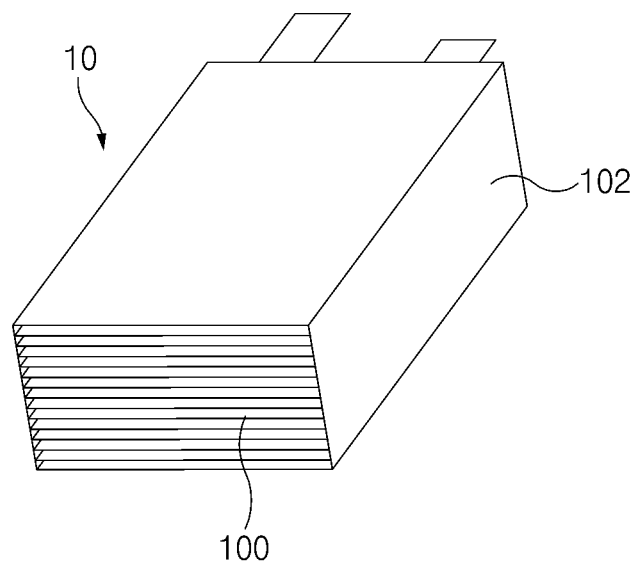
FIG. 2 is a perspective view of an electrode assembly before being pressed by a pressing press as an electrode assembly, in which a winding separator is disposed around the electrode stack, according to an embodiment of the present invention.

FIG. 1 is a side view of an electrode stack according to an embodiment of the present invention, and FIG. 2 is a perspective view of an electrode assembly before being pressed by a pressing press as an electrode assembly, in which a winding separator is disposed around the electrode stack, according to an embodiment of the present invention.

As illustrated in FIGS. 1 and 2, an electrode assembly 10 according to an embodiment of the present invention may include an electrode stack 100 in which a plurality of radical units 110 and 120 are sequentially stacked. The plurality of radical units 110 and 120 may be divided into several types according to a detailed configuration of the radical unit. For example, the plurality of radical units 110 and 120 may be constituted by a first radical unit 110 and a second radical unit 120, which have structures different from each other. In this case, the electrode stack 100 may have a structure in which the first radical unit 110 and the second radical unit 120 are alternately stacked. However, the present invention is not limited thereto. For example, the electrode stack according to an embodiment of the present invention may be constituted by three kinds or more of radical units.

In this specification, the 'radical unit' may be understood as a constituent including at least one electrode. That is, according to this specification, the 'radical unit' may be understood not only as a constituent including the electrode and a separator, but also as a constituent including only the electrode.

As illustrated in FIG. 2, the electrode assembly 10 according to an embodiment of the present invention may include a separator 102 surrounding at least a portion of a circumference of the electrode stack 100. Hereinafter, the separator surrounding at least a portion of the circumference of the electrode stack 100 is called a winding separator 102.

The winding separator 102 may surround the entire circumference of the electrode stack 100. For example, the winding separator 102 may surround the circumference of the electrode stack 100 by one turn, as illustrated in FIG. 2.

Here, 'that the winding separator 102 surrounds the circumference of the electrode stack 100 by one turn' may be understood as that both ends of the winding separator 102 overlap each other so that both the ends of the winding separator 102 are bonded to each other as illustrated in FIG. 2.

Also, 'that the winding separator 102 is capable of surrounding the entire circumference of the electrode stack 100' may not mean that the winding separator 102 surrounds the entire outer surface of the electrode stack 100 to isolate the electrode stack 100 from the outside, but mean that both ends of the winding separator 102 meet each other to be bonded to each other.

The winding separator 102 may be a separator that is separated from the separator constituting the electrode stack 100. That is, the electrode assembly 10 may have a structure in which a separator (i.e., the winding separator) that is separated from the separator within the electrode stack 100 surrounds the circumference of the electrode stack 100.

In the electrode assembly 10 according to an embodiment of the present invention, the radical units constituting the electrode stack 100 may be bi-cells. Hereinafter, the bi-cell will be described.

Figure 4:
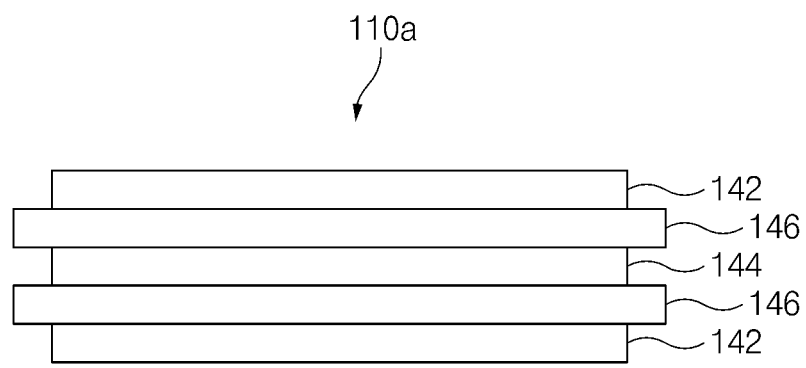
FIG. 4 is a side view of a first bi-cells constituting the electrode assembly according to an embodiment of the present invention.
Figure 5:
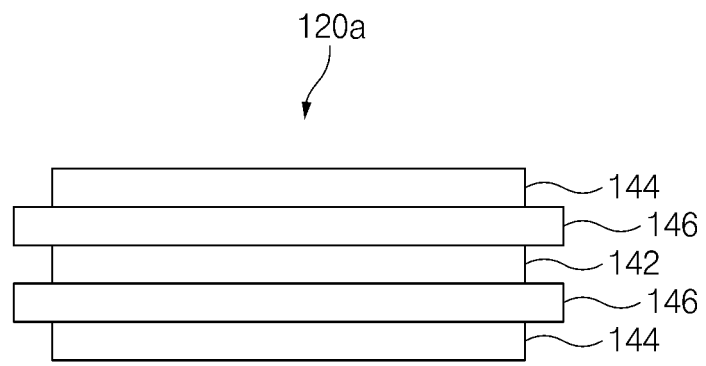
FIG. 5 is a side view of a second bi-cells constituting the electrode assembly according to an embodiment of the present invention.

FIG. 4 is a side view of a first bi-cells constituting the electrode assembly according to an embodiment of the present invention, and FIG. 5 is a side view of a second bi-cells constituting the electrode assembly according to an embodiment of the present invention.

Referring to FIG. 4, a first bi-cell 110a may be a bi-cell having a structure in which a positive electrode is disposed on each of both outermost surfaces. Here, the first bi-cell 110a may have a five-layered structure in which a positive electrode 142, a separator 146, a negative electrode 144, a separator 146, and a positive electrode 142 are sequentially disposed as illustrated in FIG. 4.

Referring to FIG. 5, a second bi-cell 120a may be a bi-cell having a structure in which a negative electrode is disposed on each of both outermost surfaces. Here, the second bi-cell 120a may have a five-layered structure in which a negative electrode 144, a separator 146, a positive electrode 142, a separator 146, and a negative electrode 144 are sequentially disposed as illustrated in FIG. 5.

As described above, the plurality of radical units may be divided into the first radical unit and the second radical unit. Also, the first bi-cell 110a may correspond to the first radical unit, and the second bi-cell 120a may correspond to the second radical unit.

When the radical units are divided into the first bi-cell and the second bi-cell, the electrode stack 100 of the electrode assembly according to the present invention may have a structure in which the first bi-cell 110a and the second bi-cells 120a are alternately stacked as illustrated in FIG. 1. Here, when the first bi-cell 110a and the second bi-cell 120a are stacked to directly contact each other, the positive electrode disposed on each of both the outermost surfaces of the first bi-cell and the negative electrode disposed on each of both the outermost surfaces of the second bi-cell may directly contact each other. To prevent this direct contact, a separate separator 130 may be disposed between the first bi-cell 110a and the second bi-cell 120a. Hereinafter, the separate separator disposed between the first bi-cell 110a and the second bi-cell 120a may be called an insertion separator 130.

That is, according to an embodiment of the present invention, the electrode stack 100 may have a structure in which the first bi-cell 110a, the insertion separator 130, and the second bi-cell 120a are alternately stacked.

Also, as illustrated in FIG. 1, the first bi-cells 110a may be disposed on all both the outermost surfaces of the electrode stack 100, respectively. That is, the positive electrode disposed on the outermost surface of the first bi-cell 110a may be disposed on all both the outermost surfaces of the electrode stack 100. Also, a single-sided positive electrode on which a positive electrode active material is applied to only one surface of a collector may be disposed on an outer surface of both the outermost surfaces of the first bi-cell 110a, which is disposed on both the outermost surfaces of the electrode stack 100 (i.e., the outermost surface of the electrode stack). Since a portion of the positive electrode disposed on both the outermost surfaces of the electrode stack (in more detail, the positive electrode active material applied to the outside of the collector) does not participate in reaction during charging and discharging, when the single-sided positive electrode is disposed on all both the outermost surfaces of the electrode stack according to an embodiment of the present invention, an electric capacity per unit volume of the electrode stack may increase.

The electrode stack 100 according to an embodiment of the present invention may be provided with eight first bi-cells 110a, seven second bi-cells 120a, and fourteen insertion separators 130 disposed between the first bi-cells 110a and the second bi-cells 120a.

The winding separator 102 may be a separator that is separated from the separator constituting the first bi-cell 110a, the separator constituting the second bi-cell 120a, and the separate insertion separator 130 disposed between the first bi-cell 110a and the second bi-cell 120a.

Figure 3:
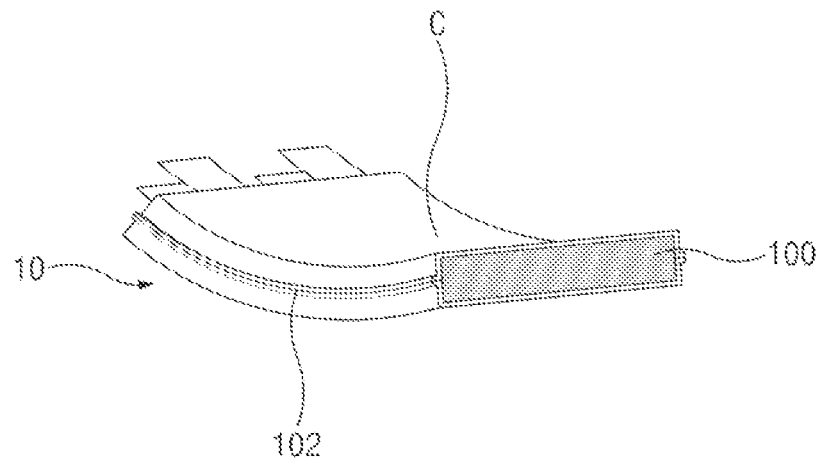
FIG. 3 is a perspective view of the electrode assembly having a curved surface, which is manufactured according to an embodiment of the present invention.

FIG. 3 is a perspective view of the electrode assembly having a curved surface, which is manufactured according to an embodiment of the present invention.

As illustrated in FIG. 3, a curved surface C having a predetermined curvature radius may be formed on the electrode stack 100 of the electrode assembly 10 according to an embodiment of the present invention. As illustrated in FIG. 3, the curved surface C may be formed on all of top and bottom surfaces of the electrode stack 100. Alternatively, the curved surface C may be formed on only the top or bottom surface of the electrode stack 100.

Here, the winding separator 102 surrounding the circumference of the electrode stack 100 may be configured to surround the curved surface C formed on the top or bottom surface of the electrode stack 100. According to the present invention, the winding separator 102 may surround the curved surface C of the electrode stack 100 to maintain a relative distance between the radical units (or the bi-cells) adjacent to each other. Thus, delamination between the radical units may be prevented. Alternatively, according to the present invention, the winding separator 102 may surround the curved surface C of the electrode stack 100 to prevent the delamination between the electrode and the separator, which constitute the electrode stack 100 and are adjacent to each other, from occurring.

In the electrode assembly 10 according to the present invention, the curved surface C of the electrode stack 100 may have a curvature radius of 70 mm to 110 mm. In more detail, the curved surface C may have a curvature radius of 80 mm to 100 mm or 85 mm to 95 mm.

In the electrode assembly having the curved surface, it is difficult to manufacture an electrode assembly on which a curved surface having a relatively small curvature radius (i.e., a curved surface that is largely curved) is formed. To manufacture the electrode assembly on which a curved surface having a small curvature radius is formed, the electrode assembly or the electrode stack has to be pressed by using a pressing press on which a curved surface is formed. This is done for a reason in which it is difficult to maintain the curved surface formed on the electrode assembly because the delamination between the electrode and the separator, which constitute the electrode stack, frequently occurs when the curvature radius is small.

As described above, the winding separator 102 is configured to prevent the delamination from occurring. Particularly, the winding separator 102 may effectively prevent the delamination between the electrode and the separator from occurring in the electrode assembly on which the curved surface having a small curvature radius is formed.

Hereinafter, a method for manufacturing an electrode assembly according to an embodiment of the present invention will be described with reference to the accompanying drawings.

Method for Manufacturing Electrode Assembly

Referring to FIGS. 1 to 5, a method for manufacturing an electrode assembly according to an embodiment of the present invention may include a preparation step of preparing a plurality of first bi-cells 110a on which positive electrodes are respectively disposed on both the outermost surfaces and a plurality of second bi-cells 120a on which negative electrodes are respectively disposed on both the outermost surfaces, a stacking step of alternately stacking each of the first bi-cells 110a, an insertion separator 130, and each of the second bi-cells 120a to manufacture an electrode stack 100, a separator winding step of allowing a winding separator 102 to surround at least a portion of a circumference of the electrode stack 100, and a curved surface formation step of pressing the electrode stack 100 by using a pressing press having a curved surface to form a curved surface C on a top or bottom surface of the electrode stack 100. The preparation step, the stacking step, the separator winding step, and the curved surface formation step may be sequentially performed in a time series.

Here, after the curved surface formation step, a winding separator 102 that surrounds at least a portion of the circumference of the electrode stack may surround the curved surface C formed on the electrode stack 100 to maintain a relative distance between the bi-cells adjacent to each other.

In the curved surface formation step, the curved surface C formed on the top or bottom surface of the electrode stack 100 may have a curvature radius of 70 mm to 110 mm. In more detail, the curved surface C may have a curvature radius of 80 mm to 100 mm or 85 mm to 95 mm.

Also, in the stacking step, the first bi-cell 110a may be disposed on each of both the outermost surfaces of the electrode stack 100. Also, a single-sided positive electrode on which a positive electrode active material is applied to only one surface of a collector may be disposed on an outer surface of both the outermost surfaces of the first bi-cell 110a, which is disposed on both the outermost surfaces of the electrode stack 100.

The first bi-cell 110a may have a five-layered structure in which a positive electrode, a separator, a negative electrode, a separator, and a positive electrode are disposed, and the second bi-cell 120a may have a five-layered structure in which a negative electrode, a separator, a positive electrode, a separator, and a negative electrode are disposed.

Also, in the stacking step, the number of first bi-cells provided in the electrode stack 100 may be eight, and the number of second bi-cells provided in the electrode stack 100 may be seven.

In the separator winding step, the winding separator 102 that surrounds at least a portion of the circumference of the electrode stack 100 may be a separator that is separated from the separator constituting the first bi-cell 110a, the separator constituting the second bi-cell 120a, and the insertion separator 130 disposed between the first bi-cell 110a and the second bi-cell 120a.

Also, in the separator winding step, the winding separator 102 that surrounds at least a portion of the circumference of the electrode stack 100 may surround the entire circumference of the electrode stack 100. Here, the meaning of 'the winding separator 102 surrounds the entire circumference of the electrode stack 100' has been described above.

In the curved surface formation step, the pressing press may press the electrode stack 100 at a temperature of 60° C. to 100° C. More preferably, the pressing press may press the electrode stack 100 at a temperature of 70° C. to 90° C. or 75° C. to 85° C.

In the curved surface formation step, the pressing press may press the electrode stack 100 at a pressure of 400 kgf to 800 kgf. More preferably, the pressing press may press the electrode stack 100 at a pressure of 500 kgf to 700 kgf or 550 kgf to 650 kgf.

In the curved surface formation step, the pressing press may press the electrode stack 100 for a time period of 40 seconds to 70 seconds. More preferably, the pressing press may press the electrode stack 100 for a time period of 45 seconds to 65 seconds.

As described above, the electrode assembly according to an embodiment of the present invention may be manufactured by surrounding the circumference of the electrode stack by using the winding separator after the plurality of radical units are sequentially stacked and bonded to each other to manufacture the electrode stack. The electrode assembly manufactured through the above-described manufacturing method may have following advantages when compared to a folding type electrode assembly manufactured by folding a separation film after a plurality of radical units are disposed on the separation film.

In a case of a stack and folding type electrode assembly, the stack and folding type electrode may be manufactured by folding a separation film after a radical unit is disposed on the separation film. In this process, since the separation film and the radical unit largely moves, the radical unit may be delaminated from the separation film in the process of folding the separation film, or the delamination between an electrode and a separator within the radical unit may easily occur. Thus, to manufacture the stack and folding type electrode assembly, bonding force between the electrode and the separator within the radical unit in the process of manufacturing the radical unit and bonding force between the radical unit and the separation film in the folding process may be necessarily strong.

However, when the bonding force between the electrode and the separator or between the radical unit and the separation film is strong before the curved surface is formed, it may be difficult to form the curved surface on the electrode assembly. That is, even though the electrode assembly is pressed by using the pressing press having the curved surface to form the curved surface on the electrode assembly, the bonding force between the electrode and the separator within the radical unit and the bonding force between the radical unit and the separation film before the curved surface is formed may act as a kind of restoring force to prevent the curved surface from being maintained. This tendency becomes stronger as the curvature radius of the curved surface formed on the electrode assembly becomes smaller (i.e., the curved surface is largely curved). Thus, the stack and folding type electrode assembly may have a problem in that the curvature radius of the curved surface is limited.

On the other hand, in the case of the electrode assembly according to an embodiment of the present invention, since the plurality of radical units are stacked to manufacture the electrode assembly, the movement of the radical unit is small in the process of manufacturing the electrode assembly. Thus, the strong bonding force between the electrode and the separator within the radical unit is unnecessary. Thus, even if the curved surface is formed by pressing the electrode assembly through the pressing press, since the restoring force due to the bonding force inside the electrode assembly is relatively small, the curvature radius of the curved surface formed on the electrode assembly may be relatively freely formed.

Embodiment 1

Eight first bi-cells, each of which has a structure in which a positive electrode, a separator, a negative electrode, a separator, and a positive electrode are alternately stacked, were prepared, seven second bi-cells, each of which has a structure in which a negative electrode, a separator, a positive electrode, a separator, and a negative electrode are alternately stacked, were prepared, and fourteen separators were prepared. Two first bi-cells of the eight first bi-cells were prepared so that a single-sided electrode is disposed on each of both the outermost surfaces thereof. Each of all the electrodes and the separators had a rectangular sheet shape.

Each of the positive electrodes used in Embodiment 1 had a horizontal length of 32.26 mm and a vertical length of 56.25 mm. Each of the negative electrodes used in Embodiment 1 had a horizontal length of 33.96 mm and a vertical length of 57.95 mm. Each of the separators used in Embodiment 1 had a horizontal length of 35.46 mm and a vertical length of 60 mm.

Thereafter, the first bi-cells, the separators, and the second bi-cells were sequentially stacked in order of the first bi-cell, the separator, the second bi-cell, and the first bi-cell from a lower side to manufacture an electrode stack (i.e., the electrode stack has a structure in which the first bi-cell is disposed on each of both the outermost surfaces). Here, the first bi-cell disposed on each of both the outermost surfaces of the electrode stack was the first bi-cell provided with the single-sided positive electrode.

Thereafter, a separator that is separated from the separator constituting the electrode stack was prepared to surround a circumference of the electrode stack by one turn, and then, both ends of the separate separator were bonded to each other.

Thereafter, an electrode assembly on which a curved surface having a curvature radius of 90 mm is formed by pressing the electrode stack through the pressing press was manufactured.

The electrode stack was pressed at a pressing temperature of 80° C., a pressing pressure of 600 kgf, and a pressing time of 50 seconds by the pressing press.

A method for measuring the curvature radius of the electrode assembly is as follows.

Three points were extracted from a virtual line formed along a shape of the curved surface formed on the electrode assembly and passing through a central area of the electrode assembly when the electrode assembly is shown from an upper side to measure a curvature radius of the curved surface from the three points. The three points extracted from the virtual line were constituted by two points, each of which is spaced 5 mm from each of both ends of the electrode assembly in a central direction of the electrode assembly, and a center point of the line segment connecting the two points. The measurement of the curvature radius from the extracted the three points was performed by Keyence's VR-3000.

Embodiment 2

The manufacturing of the electrode assembly by using the eight first bi-cells, the seven second bi-cells, and fourteen separators and the structure of the electrode stack were the same as those in Embodiment 1. Also, the process in which the separator constituting the electrode stack and the separate separator are prepared, the separate separator surrounds the circumference of the electrode stack by one turn, and both the ends of the separate separator are bonded to each other was also the same as that in Embodiment 1. Also, the horizontal and vertical lengths of the electrode and the separator were the same as those in Embodiment 1.

Also, in Embodiment 2, an electrode assembly on which a curved surface having a curvature radius of 90 mm is formed by pressing the electrode stack through the Embodiment 2 pressing press was manufactured.

The electrode stack was pressed at a pressing temperature of 80° C., a pressing pressure of 600 kgf, and a pressing time of 60 seconds by the pressing press.

A method for measuring the curvature radius of the electrode assembly was the same as that in Embodiment 1.

COMPARATIVE EXAMPLE 1

The manufacturing of the electrode assembly by using the eight first bi-cells, the seven second bi-cells, and fourteen separators and the structure of the electrode stack were the same as those in Embodiment 1. Also, the horizontal and vertical lengths of the electrode and the separator were the same as those in Embodiment 1.

Thereafter, the electrode stack was pressed without surrounding the electrode stack by using the separate separator to form a curved surface having a curvature radius of 90 mm on the electrode stack.

The electrode stack was pressed at a pressing temperature of 80° C., a pressing pressure of 600 kgf, and a pressing time of 50 seconds by the pressing press.

COMPARATIVE EXAMPLE 2

The manufacturing of the electrode assembly by using the eight first bi-cells, the seven second bi-cells, and fourteen separators and the structure of the electrode stack were the same as those in Embodiment 1. Also, the horizontal and vertical lengths of the electrode and the separator were the same as those in Embodiment 1.

Thereafter, the electrode stack was pressed without surrounding the electrode stack by using the separate separator to form a curved surface having a curvature radius of 90 mm on the electrode stack.

The electrode stack was pressed at a pressing temperature of 80° C., a pressing pressure of 600 kgf, and a pressing time of 60 seconds by the pressing press.

EXPERIMENTAL EXAMPLE

Whether the shape of the curved surface formed on the electrode assembly manufactured according to Examples and Comparative Examples is maintained and whether the separator between the electrodes and the separator, which constitute the electrode assembly, occurs were confirmed through the naked eyes.

In the case of Embodiment 1 and Embodiment 2, it was confirmed that the delamination between the electrode and the separator, which constitute the electrode assembly, does not occur while maintaining the curved surface having the curvature radius of 90 R as it is.

In the case of Comparative Example 1 and Comparative Example 2, the delamination between the electrode and the separator, which constitute the electrode assembly, occurred. Thus, it was confirmed that the curved surface is not maintained as it is.

The invention claimed is:

1. A method for manufacturing an electrode assembly, the method comprising:
    a step of preparing a plurality of first bi-cells of which a positive electrode is disposed on opposite outermost ends of each first bi-cell and a plurality of second bi-cells of which a negative electrode is disposed on opposite outermost ends of each second bi-cell;
    a stacking step of alternately stacking each of the first bi-cells, a separate separator, and each of the second bi-cells to manufacture an electrode stack;
    a separator winding step of providing a wound separator to surround at least a portion of a circumference of the electrode stack; and after the separator winding step, a curved surface formation step of pressing the electrode stack by using a pressing press having a curved surface to form a curved surface on a top or bottom surface of the electrode stack, wherein, after the curved surface formation step, the wound separator surrounding at least the portion of the circumference of the electrode stack surrounds the curved surface formed on the electrode stack to maintain a relative distance between the first and second bi-cells adjacent to each other, wherein, in the separator winding step, the wound separator surrounding at least the portion of the circumference of the electrode stack is separated from the separators of the first and second bi-cells and the separate separator disposed between the first bi-cell and the second bi-cell, wherein, in the stacking step,
the first bi-cell is disposed on opposite outermost ends of the electrode stack, and
a single-sided positive electrode on which a positive electrode active material is applied to only one surface of a collector is provided as one of the positive electrodes disposed on one of the outermost ends of the first bi-cell, which is disposed on outermost ends of the electrode stack, wherein, in the stacking step, eight first bi-cells and seven second bi-cells are provided in the electrode stack, and fourteen insertion separators are disposed between the first bi-cells and the second bi-cells, wherein, in the curved surface formation step, the pressing press presses the electrode stack at a temperature of 60° C. to 100° C., and wherein, in the curved surface formation step, the pressing press presses the electrode stack for a time period of 40 seconds to 70 seconds.

2. The method of claim 1, wherein, in the curved surface formation step, the curved surface formed on the top or bottom surface of the electrode stack has a curvature radius of 70 mm to 110 mm.

3. The method of claim 1, wherein the first bi-cell has a structure in which one of the positive electrodes, a separator, a negative electrode, a separator, and an other of the positive electrodes are disposed, and the second bi-cell has a structure in which one of the negative electrodes, a separator, a positive electrode, a separator, and an other of the negative electrodes are disposed.

4. The method of claim 1, wherein, in the separator winding step, the wound separator surrounding at least the portion of the circumference of the electrode stack surrounds the entire circumference of the electrode stack.

* * * * *